Patented Feb. 12, 1946

2,394,731

UNITED STATES PATENT OFFICE 2,394,731

PROCESS OF MAKING ESTERIFIED FOSSIL RESINS

Karl H. Weber, Lancaster, Pa., assignor to Armstrong Cork Company, Lancaster, Pa., a corporation of Pennsylvania No Drawing. Application May 29, 1943, Serial No. 489,069

6 Claims. (Cl. 260—103)

This invention relates to a process of making esterified fossil resins and, more particularly, to a process of esterifying copal resin in normal condition. By "normal condition" of copal resin, I mean copal resin that has not been depolymerized or fused prior to esterification.

Heretofore two separate processes were generally conducted to produce esters of fossil resins. In the first process, common practice resided in "running" the fossil resin to depolymerize it to an extent as to render it soluble in drying oils. The depolymerized resin is then reacted with alcohols such as glycerin, to produce the desired ester. Frequently, the depolymerized or fused resin is reacted with alcohols in the presence of a solvent for the resin. It is well known that "running" copal resin is a procedure extremely difficult to control. When depolymerization occurs, it appears to occur so quickly that it is extremely difficult to control the viscosity of the resin. In other words, when depolymerization occurs, the resin appears to break down so quickly that its viscosity is greatly reduced in an extremely short period of time—a period so short that considerable experience on the part of the operator is necessary to stop the process quickly enough to secure a resin having a desired viscosity rating. In the second process, resin esters are produced by heating the copal resin with esters such as phthalic acid dibutyl ester, benzyl acetate or the like. The formation of the resin esters in this reaction is based upon an acidolysis in such a manner that the resin acid takes the place of the acid previously contained in the ester while the latter acid is being eliminated. These procedures are expensive and complicated.

The chief object of my invention is to provide a process of esterifying fossil resins which eliminates the disadvantages inherent in prior processes. An object of my invention is to provide a process of esterifying copal resin in normal condition, which is simple, inexpensive and easily conducted. A further object is to provide a new ester of copal resin. Other objects of my invention will be readily perceived from the following description.

I have found that fossil resins such as Zanzibar copal, Madagascar copal, Mozambique copal, Congo copal, Manila copal and kauri resin can be esterified by reacting directly the resin in normal condition with an alcohol having a boiling point greater than 215° C. and selected from a group consisting of monohydric primary alcohols, monohydric secondary alcohols, and polyethylene glycols containing at least three ethylene groups. By polyethylene glycols containing at least three ethylene groups, I mean glycols above diethylene glycol. Typical monohydric and secondary alcohols which may be used are laurol, tetradecanol, heptadecanol, butyl carbitol, undecanol-2, ethyl-phenyl-carbinol, isopropyl-phenyl-carbinol, n-hexyl-phenyl-carbinol and diphenyl carbinol. Suitable polyglycols are triethylene glycol, tetraethylene glycol and nonethylene glycol. It is essential, however, in my invention that such alcohols possess a boiling point so high as to prevent any material distillation of unreacted alcohol during the process of esterification.

This direct reaction between fossil resins and high boiling alcohols permits the attainment of esters of fossil resins in a simple, convenient and inexpensive procedure, and enables the production of esters heretofore unknown.

In order to more fully describe my invention, the following illustrative examples are given:

Example 1

Congo copal in an amount of 100 grams is placed in a flask and heated with 30 grams of heptadecanol under reflux. At a temperature of 235° C. water begins to form while the material appears lumpy and gel-like. As the water distills off, the material becomes clear and homogeneous, all lumps disappearing. The temperature gradually increases to 335° C. during 4 hours' heating. After 4 hours' heating, the resulting ester has a viscosity rating of 10.3 centipoises and an acid number of 72. This ester is a somewhat brittle solid and is soluble in petroleum solvents and drying oils. It appears to be satisfactory for use as a plasticizer and as a varnish resin.

Example 2

100 grams of Congo copal and 30 grams of tetradecanol are heated in a flask under reflux. Water begins to form at a temperature of 220° C. and the material appears lumpy and gel-like. After the water distills, the material becomes clear and homogeneous and all lumps disappear. The material is heated for approximately 6½ hours, its temperature at the end of such period being 307° C. The resulting ester possesses a viscosity rating of 79–80 centipoises and an acid number of approximately 76. This ester is a slightly brittle solid which is soluble in petroleum solvents and drying oils. It appears to be satisfactory for use as a plasticizer and as a varnish resin.

Example 3

100 grams of Congo copal and 20 grams of tetraethylene glycol are heated in a flask under reflux. At 190° C., water begins to form and to distill. The material is heated for a total of four hours and at the end of such period the temperature is approximately 320° C. The resulting ester possesses a viscosity rating of 1.5 centipoises and an acid number of 5.1. The product is somewhat plastic and appears to be satisfactory for use as a plasticizer.

I have found that fossil resins such as Congo copal may be esterified by reacting the resin in normal condition directly with high boiling alcohols of the types described above. A catalyst is not necessary and the procedure is simple and inexpensive. The disadvantages inherent in prior procedures are eliminated and the necessity of running the fossil resin is obviated. The described procedure provides a simple and economical method of controlling the viscosity of fossil resins, since the resin immediately reacts with the high boiling alcohols before extensive depolymerization occurs and thus prevents the rapid and sudden drop in viscosity encountered in prior processes. The esters produced by my invention are present in greater yields than heretofore obtainable. Yields as great as 85% based on the theoretical yield are obtainable.

While I have described certain preferred embodiments of my invention, it will be understood my invention is not limited thereto since it may be otherwise embodied within the scope of the following claims.

I claim:

1. In a process for the manufacture of esters of fossil resins by the direct reaction of an undissolved, polymerized fossil resin and an alcohol, the step which comprises directly reacting such fossil resin in the absence of an inert solvent therefor with an alcohol having a boiling point of at least 215° C. and selected from the group consisting of monohydric primary alcohols, monohydric secondary alcohols, and polyethylene glycols containing at least three ethylene groups.

2. A process in accordance with claim 1 in which the fossil resin is copal.

3. A process in accordance with claim 1 in which the alcohol is heptadecanol.

4. A process in accordance with claim 1 in which the fossil resin is copal and the alcohol is heptadecanol.

5. A process in accordance with claim 1 in which the fossil resin is copal and the alcohol is undecanol-2.

6. A process in accordance with claim 1 in which the fossil resin is copal and the alcohol is tetraethylene glycol.

KARL H. WEBER.